United States Patent
Alley et al.

(10) Patent No.: US 9,008,197 B2
(45) Date of Patent: Apr. 14, 2015

(54) CURRENT LOOP VOLTAGE MODULATOR FOR COMMUNICATION INTERFACE

(71) Applicant: General Electric Company, Schenectady, NY (US)

(72) Inventors: Daniel Milton Alley, Salem, VA (US); Bruce Henderson, Salem, VA (US); Vitaly Alexandrovich Tkachuk, Reston, VA (US); Longhui Shen, ShangHai (CN); Ye Xu, ShangHai (CN); Alan Carroll Lovell, Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/952,354

(22) Filed: Jul. 26, 2013

(65) Prior Publication Data

US 2015/0030089 A1 Jan. 29, 2015

(51) Int. Cl.
*H04L 27/00* (2006.01)
*H04B 3/54* (2006.01)

(52) U.S. Cl.
CPC ........................................ *H04B 3/54* (2013.01)

(58) Field of Classification Search
USPC ......... 375/219, 222, 257, 259–260, 377, 316; 257/212, 499, 798; 710/5, 8, 15, 29, 710/33; 361/64
See application file for complete search history.

(56) References Cited

U.S. PATENT DOCUMENTS

| 4,173,714 | A | 11/1979 | Bloch et al. |
| 6,901,336 | B2 | 5/2005 | Tesdahl et al. |
| 7,170,394 | B2 | 1/2007 | Chandler et al. |
| 7,495,451 | B2 * | 2/2009 | Krouth et al. ............... 324/522 |
| 7,663,350 | B2 * | 2/2010 | Kirst ............................. 323/268 |
| 8,073,991 | B2 | 12/2011 | Alley et al. |
| 2003/0079070 | A1 | 4/2003 | Cho et al. |
| 2004/0184517 | A1 * | 9/2004 | Westfield et al. ............ 375/219 |
| 2008/0013226 | A1 * | 1/2008 | Kirst ............................ 361/18 |
| 2008/0158754 | A1 * | 7/2008 | Krouth et al. ................. 361/86 |
| 2009/0015216 | A1 * | 1/2009 | Seberger et al. ............. 323/234 |
| 2012/0253481 | A1 * | 10/2012 | Alley et al. ................... 700/21 |
| 2013/0107919 | A1 * | 5/2013 | Burns et al. .................. 375/219 |

FOREIGN PATENT DOCUMENTS

| CN | 102538904 A | 7/2012 |
| CN | 102736513 A | 10/2012 |
| WO | 2011119892 A1 | 9/2011 |

OTHER PUBLICATIONS

Maxim Integrated; DS8500 Hart Modem; Feb. 2009.
Cox Peter; AND8346/D; A519HRT Hart Modem; Jul. 2011.
Search Report from PCT/CN2013/072847 dated Dec. 26, 2013.

* cited by examiner

*Primary Examiner* — Jean B Corrielus
(74) *Attorney, Agent, or Firm* — Fletcher Yoder, P.C.

(57) ABSTRACT

Systems for communicating over a communication interface are provided. An integrated circuit includes circuitry for monitoring a current flowing between two terminals of the integrated circuit. The integrated circuit also includes a voltage driver circuit for modulating a voltage between two terminals of the integrated circuit. The voltage driver modulates the voltage across the two terminals of the integrated circuit to encode data according to the Highway Addressable Remote Transducer protocol.

19 Claims, 5 Drawing Sheets

CURRENT LOOP VOLTAGE MODULATOR FOR COMMUNICATION INTERFACE

CROSS-REFERENCE TO RELATED APPLICATION

This application is a Non-Provisional Application that claims priority to and the benefit of International Patent Application No. PCT/CN2013/072847, entitled "Current Loop Voltage Modulator for Communication Interface", filed Mar. 19, 2013, which is herein incorporated by reference in its entirety.

BACKGROUND

The subject matter disclosed herein relates to communication by voltage modulation and current sensing.

Often, programmable logic controllers (PLCs), distributed control systems (DCSs), and balance of plant (BOPS) communicate using the Highway Addressable Remote Transducer (HART) protocol. As such, the HART protocol is often used in asset management. For example, HART is used in power plants to constantly scan devices and gather operation data. A receiver device communicating on the HART protocol requires the ability to modulate the terminal voltage between two terminals while monitoring the loop current flowing between the terminals. Generally, a HART communication device uses a transformer to impress a voltage while not altering the current. However, using a transformer is not practical for a solid state design such as implemented within an integrated circuit such as an application specific integrated circuit (ASIC). The reliance on such relatively large, discrete components stands in the way of implementing the HART protocol onto a switching block of an ASIC chip.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an integrated circuit includes a circuit configured to monitor a current flowing between two terminals of the integrated circuit. Additionally, the integrated circuit includes a voltage driver configured to modulate a voltage across the two terminals of the integrated circuit while maintaining the current flowing between the two terminals of the integrated circuit. The voltage driver modulates the voltage across the two terminals according to the Highway Addressable Remote Transducer (HART) protocol.

An additional embodiment includes a system including a transmitter and a receiver electrically coupled together by wires forming a current loop. The receiver includes an ASIC that includes a circuit designed to monitor a current flowing through the current loop, and a voltage driver designed to modulate a voltage across two terminals of the current loop while maintaining the current flowing through the current loop. The transmitter transfers information to the receiver by modulating the current flowing through the current loop, and the receiver transfers information to the transmitter by modulating the voltage across the two terminals of the current loop.

In an additional embodiment, an electronic circuit includes a resistor designed to form a voltage across its terminals in relation to a current flowing through a current loop. The current loop is formed between the electronic circuit and a transmitting circuit. The electronic circuit also includes a differential amplifier designed to generate a signal in relation to the voltage formed by the resistor. The signal is passed to a modulator-demodulator (modem) and an analog-to-digital converter (ADC) for processing. Additionally, the electronic circuit includes a voltage driving circuit that receives signals from the modem and modulates a voltage across terminals of the current loop based on the signals received from the modem.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in further detail below, present embodiments relate to circuitry of a receiver designed to communicate over the Highway Addressable Remote Transducer (HART) protocol. In order to communicate, a voltage driver circuit modulates the terminal voltage of the HART receiver while a current sensing circuit monitors the loop current flowing between the terminals. In this way, the voltage driver circuit maintains the current value provided by the HART transmitter while varying the voltage value of the signal as needed. Circuits with these characteristics may also be called current followers. In certain embodiments, the circuitry of the HART receiver is made up of discrete components, while in other embodiments, the circuitry is part of an integrated circuit (e.g., an application specific integrated circuit (ASIC)).

Figure 1:
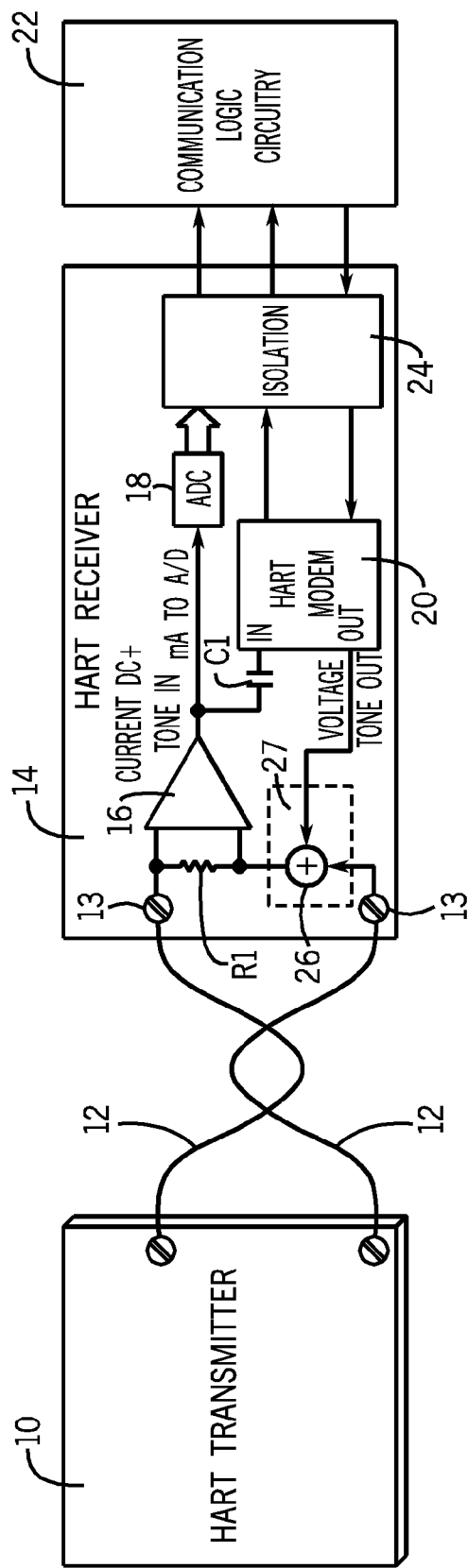
FIG. 1 illustrates a HART transmitter and a HART receiver electrically coupled with a current loop, in accordance with an embodiment.

With the foregoing in mind, it may be useful to describe an embodiment of the HART receiver circuitry, such as illustrated in FIG. 1. In the illustrated embodiment, a HART transmitter 10 is electrically coupled to current loop wires 12 forming a current loop with a HART receiver 14. In order to send information to the HART receiver 14, the HART transmitter 10 may utilize the HART communications protocol. The HART protocol may use the Bell 202 Frequency Shift Keying (FSK) standard, varying the frequency of the current signal in order to key digital bits into the signal. The current signal may be a periodic and sinusoidal low bandwidth direct current (DC) to 25 Hz signal in the 4 mA to 20 mA range. Since the HART protocol is half duplex, only the HART transmitter 10 may modulate the current through the current loop wires 12 or the HART receiver 14 may modulate the voltage across the current loop terminals 13 at a given time.

The current modulated by the HART transmitter 10 may flow through the current loop wires 12 and through a current sensing resistor R1 of the HART receiver 14. In certain embodiments, the current sensing resistor R1 may have a value of 250Ω, but in other embodiments, the current sensing resistor may have other appropriate resistance values. As the current flows through the current sensing resistor R1, a voltage bias may form on either side of the current sensing resistor R1. A differential amplifier 16 may have two inputs electrically coupled on either side of the current sensing resistor R1, and may be designed to generate a current signal in relation to the voltage bias across the two inputs. As more current flows through the current sensing resistor R1, a larger voltage bias forms across either side, and the differential amplifier generates a larger current signal. The current signal generated by the differential amplifier 16 may be passed to an analog-to-digital converter (ADC) 18 as well as a HART modulator-demodulator (modem) 20. The ADC 18 may convert the analog current signal produced by the differential amplifier 16 into a digital signal that may be interpreted by communication logic circuitry 22. Similarly, the HART modem 20 may de-modulate the information carried by the current signal, and pass the information to the communication logic circuitry 22. In the illustrated embodiment, a capacitor C1 may filter the DC components out of the current signal before the current signal is passed to the HART modem 20. As illustrated by the isolation block 24 in the HART receiver 14, the circuitry of the HART receiver 14 provides galvanic isolation between the HART receiver circuitry and the communication logic circuitry 22.

In addition to de-modulating the current flowing through the current loop, the HART receiver 14 may also modulate the terminal voltage of the current loop in order to transmit information to the HART transmitter 10. The communication logic circuitry 22 may send information to the HART modem 20 to be converted into voltage signals. A summing circuit 26 may receive the voltage signals and add them to the current flowing through the current loop to modulate the terminal voltage of the current loop. It should be noted that the summing circuit may add voltage signals to modulate the terminal voltage of the current loop, but the current flowing through the current loop may be unchanged by the HART receiver 14 circuitry. The summing circuit 26 may also be referred to as a voltage driver 27.

Figure 2:
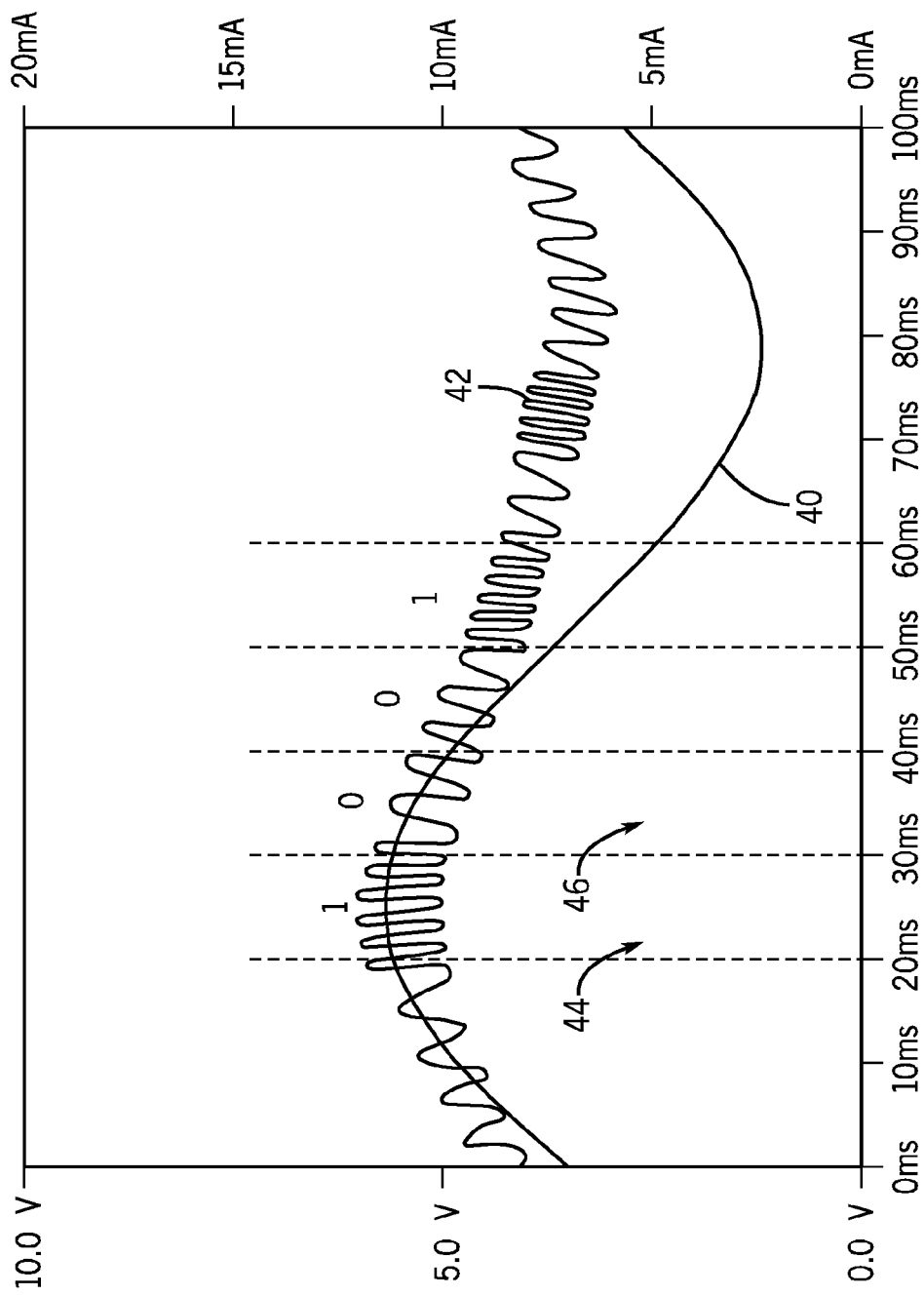
FIG. 2 is a graph showing the current flowing through a current loop as well as the voltage across the terminals of the current loop, in accordance with an embodiment.

As mentioned above, in order to communicate using the HART protocol, the HART transmitter 10 may modulate the current flowing through the current loop, and the HART receiver 14 may modulate the voltage across the terminals 13 of the current loop. FIG. 2 is a graph that illustrates both current signals and voltage signals that may be present in communication between a HART transmitter 10 and a HART receiver 14. A first waveform 40 may represent a current modulated signal and a second waveform 42 may represent a voltage modulated signal. As mentioned and illustrated, the first waveform 40 may be a low bandwidth DC to 25 Hz signal in the 4 mA to 20 mA range. Information bits may be encoded into the current modulated signal 40 by varying the frequency of the signal. For example, to encode a digital "1", the HART transmitter 10 may set the frequency of the current modulated signal 40 to 23 Hz, and to encode a digital "0", the HART transmitter 10 may set the frequency of the signal to 10 Hz. As mentioned, this method of encoding information bits is called Frequency Shift Keying (FSK).

In the same way, the HART receiver 14 may encode information on the voltage modulated signal using FSK. In the illustrated embodiment, the voltage modulated signal is a 10 Hz periodic sinusoid modulated with much higher frequency tones (500-1000 Hz). As can be seen, the modulated frequency of the signal varies to encode digital bits into the signal. During time segment 44, the frequency of the voltage modulated signal may be relatively high (1000 Hz), encoding a digital "1". In subsequent time segment 46, the frequency may be relatively low (500 Hz), encoding a digital "0". It should be noted that other frequencies may be used to encode digital bits as long as they are substantially different enough to be distinguished by the circuitry of the HART transmitter 10 or the HART receiver 14. The HART transmitter 10 may sense the tone encoding the digital information by AC coupling the terminal voltage through a filter and a demodulator.

Figure 3:
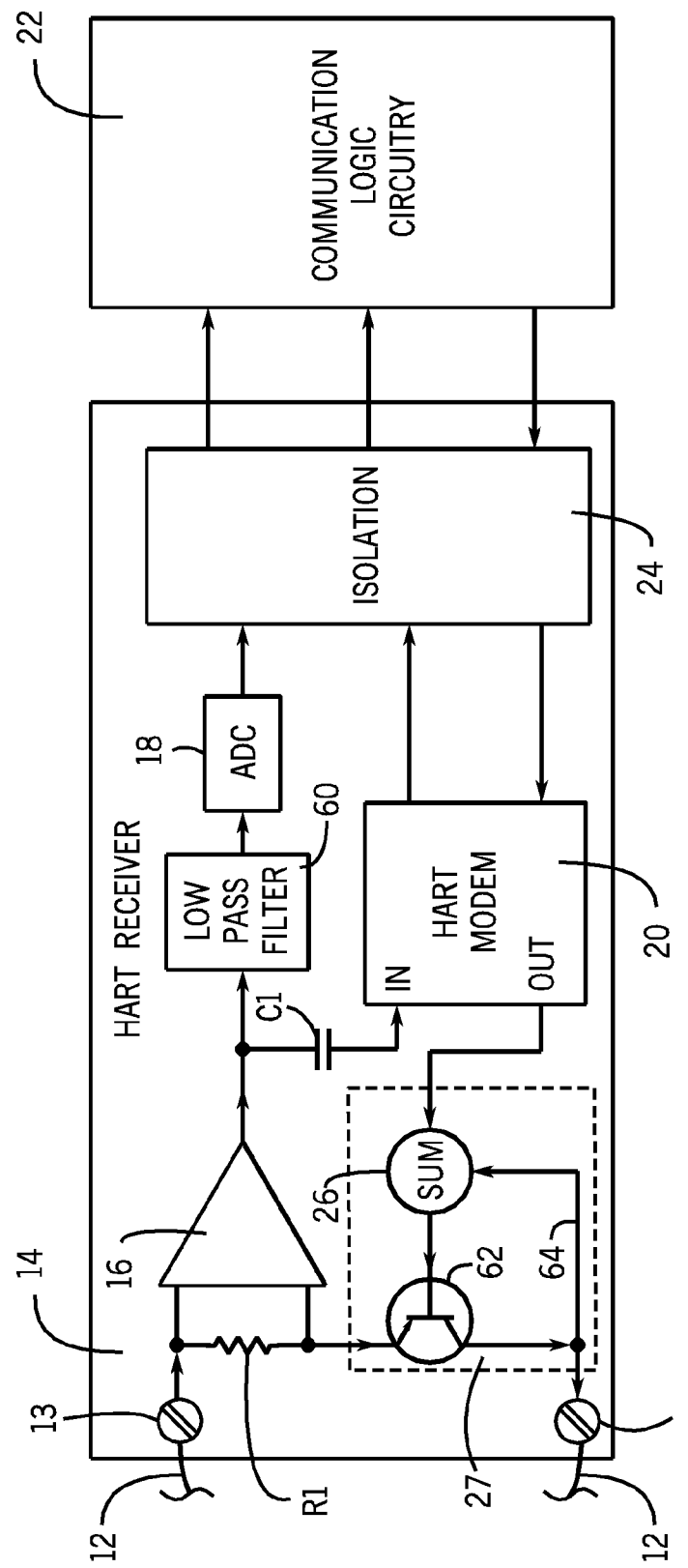
FIG. 3 illustrates an example of the HART receiver circuitry that was a voltage driver in series with a current sensing resistor, in accordance with an embodiment.

FIG. 3 illustrates an alternative embodiment of the circuitry of the HART transmitter 14 shown in FIG. 1. As before, the current modulated by the HART transmitter 10 may flow through the current loop wires 12 and through the current sensing resistor R1. The differential amplifier 16 may have two inputs electrically coupled to either side of the current sensing resistor R1 to generate an output signal in relation to the voltage bias across the current sensing resistor R1. In the embodiment of FIG. 3, the signal generated by the differential amplifier 16 may pass through a low pass filter 60 before being passed to the ADC 18. The low pass filter 60 may remove alternating current (AC) components of the signal so that the ADC 18 receives a direct current (DC) signal.

As shown in FIG. 1, the HART receiver 14 may include the HART modem 20 to demodulate the signals received from the HART transmitter 10 and modulate the terminal voltage of the current loop terminals 13. However, the voltage driver 27 of the embodiment of FIG. 3 may include a transistor 62 to form a common collector buffer. The illustrated transistor 62 is a PNP bipolar junction transistor (BJT), but other embodiments may include an NPN BJT, a p-type metal-oxide-semiconductor (PMOS) transistor, or an n-type metal-oxide-semiconductor (NMOS) transistor. Offset voltage from the transistor 62 may be allowed on a current return line 64, where the summing circuit 26 may provide a differential output voltage for the modulation of the terminal voltage. In this way, the voltage driver 27 of the embodiment of FIG. 3 may modulate the terminal voltage of the current loop to encode information intended for the HART transmitter 10.

Figure 4:
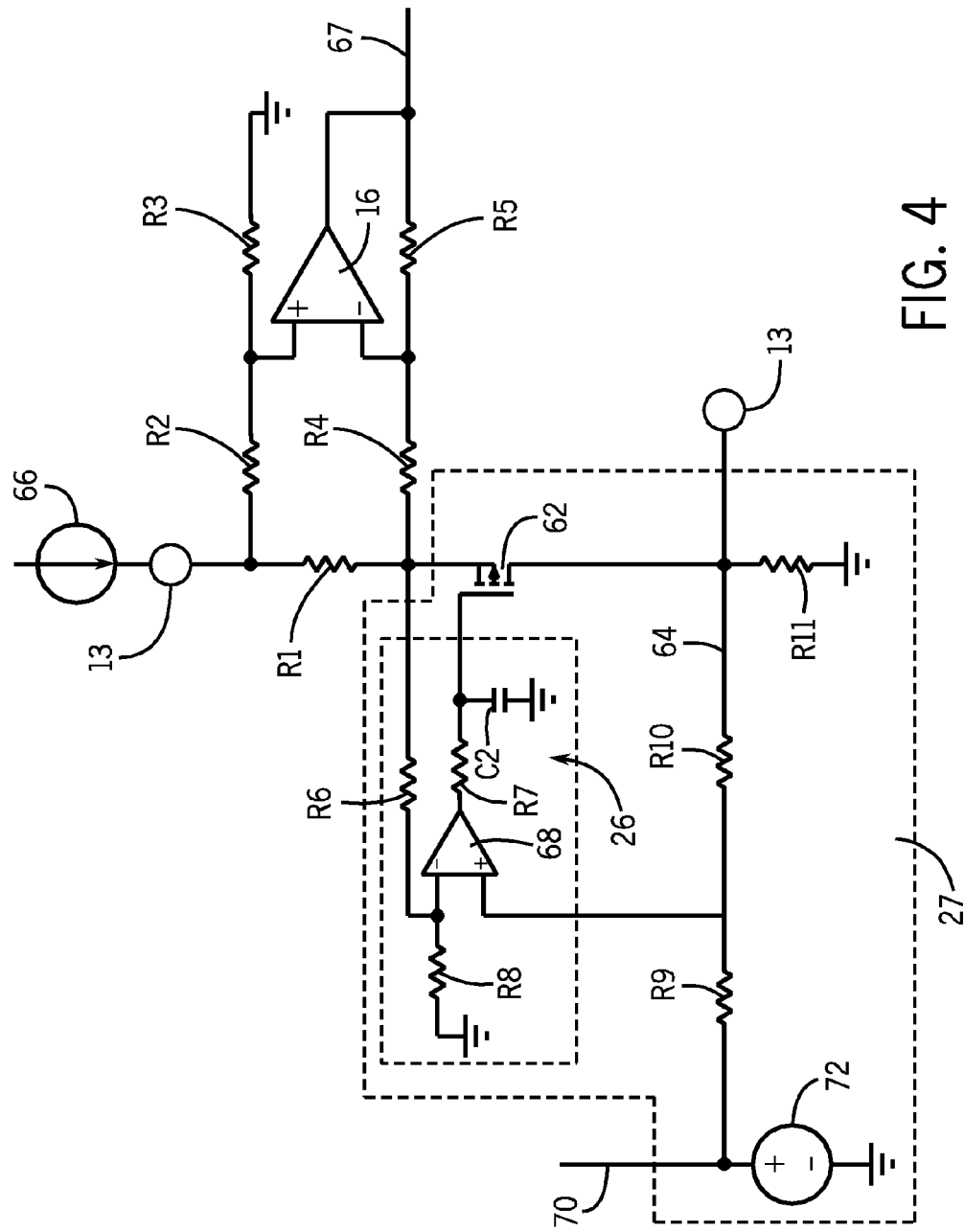
FIG. 4 illustrates a circuit-level diagram of the HART receiver circuitry illustrated in FIG. 3.

A circuit diagram of FIG. 4 illustrates the circuitry of the embodiment of the HART receiver 14 described in FIG. 3 with additional detail. As before, the circuitry includes the differential amplifier 16 designed to generate a signal in relation to the current flowing through the current sensing resistor R1. The signal propagates on output line 67 to the ADC 18 and the HART modem 20 as illustrated in FIG. 3. Resistors R2, R3, R4, and R5 may be electrically coupled to inputs and outputs of the differential amplifier 16 to set the operation parameters of the amplifier. In certain embodiments, resistors R2 and R4 may have a value of 100 kΩ, while resistors R3 and R5 may have a value of 400 kΩ. In other embodiments, other resistances may be appropriate for resistors R2, R3, R4, and R5. Additionally, in the illustrated embodiment, current flowing from the HART transmitter 10 is modeled by a current source 66 since the current flowing through the current loop may be constant when the HART receiver 14 is modulating the terminal voltage of the current loop.

In the embodiment of FIG. 4, it should be noted that the transistor 62 of the voltage driver 27 is a PMOS transistor, but may also be a PNP BJT transistor or any other suitable transistor such as a BJT (NPN or PNP), complementary metal-oxide-semiconductor (CMOS) transistor, or an NMOS transistor. The summing circuit 26 of the voltage driver may include a differential amplifier 68 that receives an offset voltage from the transistor 62 on the current return line 64 to provide a differential output voltage to the gate of the transistor 62. In certain embodiments where the transistor 62 is a PNP BJT transistor, the differential amplifier may provide a differential output voltage to the base of the transistor 62. As the voltage applied to the base or the gate of the transistor 62 is varied, the impedance of the transistor may be varied as well, effectively modulating the voltage bias between the terminals 13 of the current loop.

Additionally, the differential amplifier 68 of the summing circuit 26 may receive a modulating signal from the HART modem output 70 that plays a part in determining the differential output voltage being applied to the base or the gate of the transistor 62 and, therefore, the modulation of the terminal voltage. In certain embodiments, a voltage source may offset the modulating signal from the HART modem output 70 to maintain correct bias on the transistor at all times. The correct bias may ensure that a voltage across the gate and source of the transistor 62 is sufficient to maintain current flow through the transistor 62. Resistors R6, R7, R8, R9, and R10 may be electrically coupled to the differential amplifier 68 to set the operation parameters of the amplifier. In certain embodiments, resistors R6, R8, R9, and R10 may have a value of 100 kΩ, while resistor R7 may have a value of 1000Ω. In other embodiments, other resistances may be selected for resistors R6, R7, R8, R9, and R10 to permit communication using the HART receiver 14. Resistor R11 may represent the resistance of the current loop wires 12 of the return path to the HART transmitter 10. In the illustrated embodiment, resistor R11 may have a value of 50Ω, but in other embodiments, resistor R11 may have any other appropriate resistance that represents the resistance of the current loop wires 12. Additionally, certain embodiments may include a grounded capacitor C2 at the gate or the base of the transistor 62 to stabilize relatively small oscillations in the signal being provided to the transistor 62 gate or base or the voltage across the differential amplifier 68. The capacitor C2 may have a capacitance of 80 pF or any other appropriate capacitance.

Figure 5:
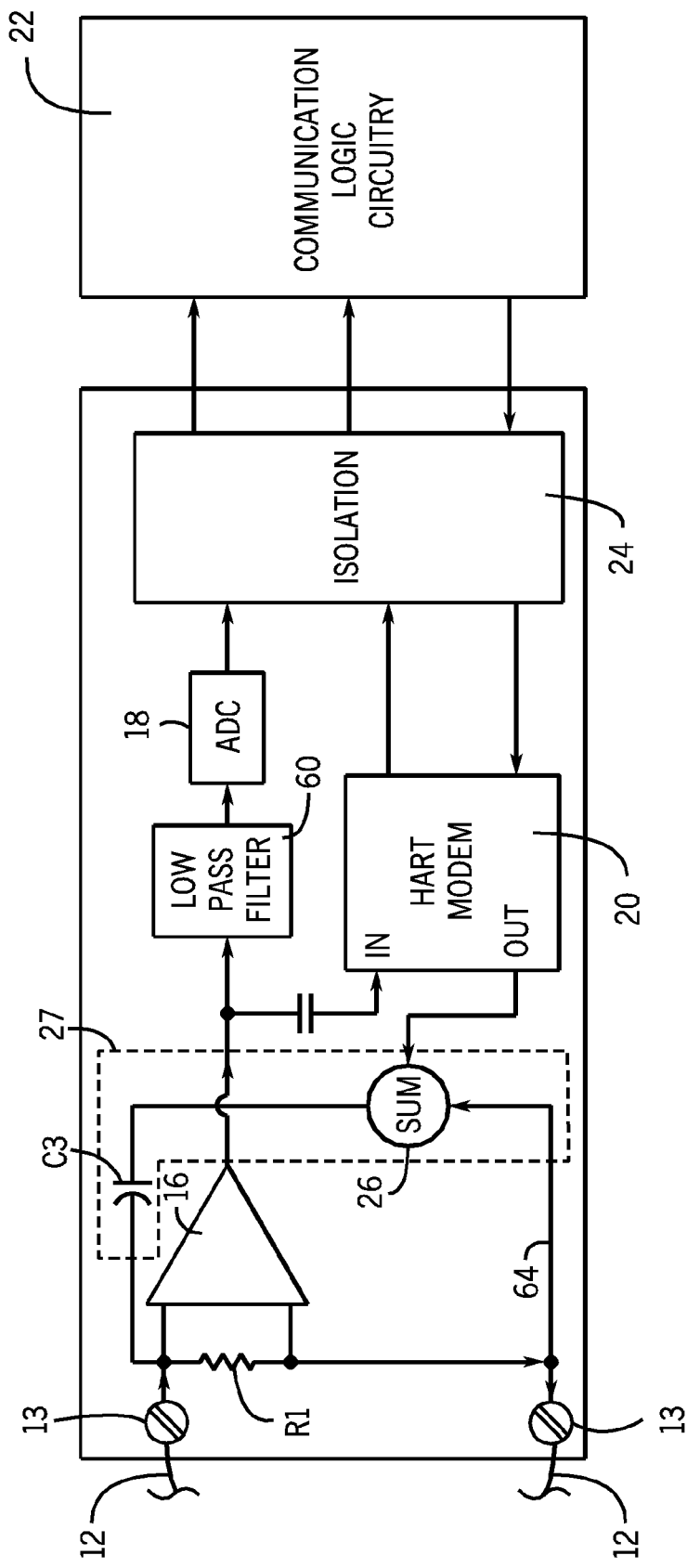
FIG. 5 illustrates an example of the HART receiver circuitry that uses a voltage driver in parallel with a current sensing resistor, in accordance with an embodiment.

A further embodiment of the circuitry of the HART receiver 14 is illustrated in FIG. 5. The embodiment includes the same circuitry for monitoring the loop current as the embodiments described in FIG. 1, FIG. 3, and FIG. 4. However, while FIGS. 1, 3, and 4 demonstrate embodiments with the voltage driver 27 in series with the current sensing resistor R1, the embodiment of FIG. 5 illustrates the voltage driver 27 in a parallel configuration including a coupling capacitor C3. In general, coupling capacitors are utilized to block a DC component of a signal while allowing the AC component to pass. In this way, when the summing circuit 26 receives signals from the current return line 64 and the HART modem 20 and outputs a modulating signal to the coupling capacitor C3, the coupling capacitor C3 modulates the terminal voltage of the current loop without varying the current flowing through the loop.

It should be noted that the size of the coupling capacitor C3 may be much larger than what is practical for an integrated circuit. The large capacitance may be used to drive the relatively low impedance of the current loop. In the case that the capacitance of the coupling capacitor C3 is larger than practical for an integrated circuit, the coupling capacitor C3 may be external to the rest of the integrated circuit and may consume two additional package pins for connecting the integrated circuit to a larger circuit.

Technical effects of embodiments include HART receiver circuitry designed to monitor a current flowing in a current loop while modulating the terminal voltage of the current loop. In certain embodiments, a voltage driver circuit is in series with a current sensing resistor. A differential amplifier may amplify the voltage difference across the current sensing resistor and pass a signal to a HART modem and an analog-to-digital converter to decode the information sent by a HART transmitter. The HART modem and a feedback signal from a transistor are summed by a summing circuit and applied to the gate or base of the transistor to modulate the voltage between the terminals of the current loop, effectively transmitting information to the HART transmitter. Other embodiments of the HART receiver circuitry dispose the voltage driver circuit in parallel with the current sensing resistor. A coupling capacitor is used with a feedback driven summing circuit and a HART modem to modulate the terminal voltage of the current loop in order to transmit information to the HART transmitter. In each embodiment, the circuitry may be implemented without the use of a transformer, enabling the HART circuitry to be placed on an integrated circuit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An integrated circuit, comprising:
differential amplifier having a first input and a second input, wherein the first input is coupled directly to a first of two terminals of the integrated circuit and wherein the second input is coupled indirectly to a second of the two terminals of the integrated circuit, and wherein the differential amplifier is configured to generate a voltage difference signal in relation to a voltage difference across the first input and the second input;
a modulator-demodulator (modem) configured to receive the voltage difference signal and generate an output signal; and
a voltage driver configured to modulate a voltage across the two terminals of the integrated circuit according to the output signal from the modem while maintaining the current flowing between the two terminals of the integrated circuit;

wherein the output signal from the modem is configured to cause the voltage driver to modulate the voltage across the two terminals of the integrated circuit to encode data according to the Highway Addressable Remote Transducer (HART) protocol.

2. The integrated circuit of claim 1, wherein, between the first input and the second input of the differential amplifier, a resistor is disposed that is configured to generate a voltage across the first input and the second input in relation to the current flowing between the two terminals of the integrated circuit.

3. The integrated circuit of claim 2, wherein the voltage driver is disposed in series with the resistor.

4. The integrated circuit of claim 2, wherein the voltage driver is disposed in parallel with the resistor.

5. A system, comprising:
 a transmitter; and
 a receiver comprising an integrated circuit and electrically coupled to the transmitter by wires forming a current loop, the integrated circuit comprising:
  a differential amplifier having inputs across a current flowing through the current loop, wherein the differential amplifier is configured to monitor a current flowing through the current loop to produce a voltage difference signal;
  a modulator-demodulator (modem) configured to generate an output signal based on the voltage difference signal; and
  a voltage driver configured to modulate a voltage across two terminals of the current loop based on the output signal from the modem while maintaining the current flowing through the current loop;
 wherein the transmitter is configured to transfer information to the receiver by modulating the current flowing through the current loop, and the receiver transfers information to the transmitter by modulating the voltage across the two terminals of the current loop.

6. The system of claim 5 comprising communication logic circuitry configured to send information to the modem to be modulated and to receive demodulated information from the modem.

7. The system of claim 5, wherein the circuitry of the integrated circuit provides a galvanic barrier between the circuitry of the integrated circuit and any external circuits.

8. An electronic circuit, comprising:
 a resistor configured to form a voltage across its terminals in relation to a current flowing through a current loop formed between the electronic circuit and a transmitting circuit;
 a differential amplifier configured to generate a signal in relation to the voltage formed by the resistor, wherein the signal is passed to a modulator-demodulator (modem) and an analog-to-digital converter for processing; and
 a voltage driving circuit configured to receive signals from the modem and modulate a voltage across terminals of the current loop based on the signals received from the modem.

9. The electronic circuit of claim 8, wherein the electronic circuit is entirely formed as part of an integrated circuit.

10. The electronic circuit of claim 8, wherein the electronic circuit comprises at least one discrete component.

11. The electronic circuit of claim 8, wherein the voltage driving circuit is disposed in series with the resistor.

12. The electronic circuit of claim 11, wherein the voltage driving circuit comprises:
 a transistor configured to modulate the voltage across the terminals of the current loop based on a signal applied to a gate of the transistor; and
 a summing circuit configured to add signals from the modem to signals flowing through the transistor and apply a resulting signal to the gate of the transistor.

13. The electronic circuit of claim 12, wherein the transistor comprises a bipolar junction transistor (BJT).

14. The electronic circuit of claim 12, wherein the transistor comprises a metal-oxide-semiconductor transistor (MOSFET).

15. The electronic circuit of claim 11, wherein the voltage driving circuit comprises a summing circuit configured to add signals from the modem to signals flowing through the current loop to modulate the voltage across the terminals of the current loop.

16. The electronic circuit of claim 8, wherein the voltage driving circuit is disposed in parallel with the resistor.

17. The electronic circuit of claim 16, wherein the voltage driving circuit comprises:
 a summing circuit configured to add signals from the modem to current flowing through the current loop to generate a resulting signal; and
 a coupling capacitor configured to pass an alternating current (AC) component of the resulting signal from the summing circuit to modulate the voltage across the terminals of the current loop.

18. The electronic circuit of claim 8 comprising a low pass filter configured to filter out the high frequency components of the signal generated by the differential amplifier before passing the signal to the ADC.

19. The electronic circuit of claim 8, wherein the electronic circuit does not comprise a transformer.

* * * * *

UNITED STATES PATENT AND TRADEMARK OFFICE
CERTIFICATE OF CORRECTION

| | | |
|---|---|---|
| PATENT NO. | : 9,008,197 B2 | Page 1 of 1 |
| APPLICATION NO. | : 13/952354 | |
| DATED | : April 14, 2015 | |
| INVENTOR(S) | : Alley et al. | |

It is certified that error appears in the above-identified patent and that said Letters Patent is hereby corrected as shown below:

In the Specification

In Column 1, Line 19, delete "(BOPS)" and insert -- (BOPs) --, therefor.

In Column 4, Line 34, delete "transmitter 14" and insert -- transmitter 10 --, therefor.

Signed and Sealed this
First Day of December, 2015

Michelle K. Lee
*Director of the United States Patent and Trademark Office*